United States Patent
Suciu et al.

(10) Patent No.: US 10,024,235 B2
(45) Date of Patent: Jul. 17, 2018

(54) OFFSET CORE ENGINE ARCHITECTURE

(71) Applicant: United Technologies Corporation, Hartford, CT (US)

(72) Inventors: Gabriel L. Suciu, Glastonbury, CT (US); James D. Hill, Tolland, CT (US); Jesse M. Chandler, South Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 598 days.

(21) Appl. No.: 14/608,227

(22) Filed: Jan. 29, 2015

(65) Prior Publication Data
US 2015/0247456 A1    Sep. 3, 2015

Related U.S. Application Data

(60) Provisional application No. 61/947,036, filed on Mar. 3, 2014.

(51) Int. Cl.
*F02C 3/14* (2006.01)
*F02C 3/06* (2006.01)
(Continued)

(52) U.S. Cl.
CPC .................. *F02C 3/14* (2013.01); *F02C 3/06* (2013.01); *F02C 3/10* (2013.01); *F02C 6/02* (2013.01);
(Continued)

(58) Field of Classification Search
CPC .... F02C 3/10; F02C 3/103; F02C 6/02; F02C 3/14; F02C 7/05; F02K 3/12; F05D 2220/32; F05D 2250/314
See application file for complete search history.

(56) References Cited

U.S. PATENT DOCUMENTS 2,168,726 A * 8/1939 Whittle ............... F02K 5/02
                                                      123/41.56
2,601,194 A * 6/1952 Whittle ............... F02K 3/12
                                                       60/226.1
(Continued)

FOREIGN PATENT DOCUMENTS

DE          1923402 A1 * 11/1969  ............... F02K 3/12
DE         10116535 A1 *  2/2002  ............... F02C 3/045
(Continued)

OTHER PUBLICATIONS

WO 02081883 A2 Englsih Translation.*
European Search Report for EP Application No. 15157466.2 dated Aug. 4, 2015.

*Primary Examiner* — Phutthiwat Wongwian
*Assistant Examiner* — Jessica Kebea
(74) *Attorney, Agent, or Firm* — Carlson, Gaskey & Olds, P.C.

(57) ABSTRACT

A gas turbine engine has a propulsion unit and a gas generating core. The propulsion unit includes a fan and a free turbine, wherein the free turbine is connected to drive the fan about a first axis. The gas generating core includes a compressor, a combustion section, and a gas generating core turbine. The compressor and the gas generating core turbine are configured to rotate about a second axis. An inlet duct is configured to deliver air from the fan to the gas generating core. The inlet duct has a crescent shaped cross-section near the fan.

14 Claims, 4 Drawing Sheets

(51) Int. Cl.
*F02C 3/10* (2006.01)
*F02C 6/02* (2006.01)
*F02C 7/05* (2006.01)
*F02K 3/12* (2006.01)

(52) U.S. Cl.
CPC ............... *F02C 7/05* (2013.01); *F02K 3/12* (2013.01); *F05D 2220/32* (2013.01); *F05D 2250/314* (2013.01)

(56) References Cited

U.S. PATENT DOCUMENTS

| | | | | |
|---|---|---|---|---|
| 2,704,434 A * | 3/1955 | Schmitt | ............... | F02K 3/12 60/263 |
| 3,131,536 A * | 5/1964 | Stanley | ............... | F02K 3/06 60/226.1 |
| 3,355,890 A * | 12/1967 | Gottfried | ............... | B64C 11/001 415/194 |
| 3,368,352 A * | 2/1968 | Hewson | ............... | F02K 3/025 60/224 |
| 5,483,791 A | 1/1996 | Kotwal et al. | | |
| 8,015,796 B2 * | 9/2011 | Babu | ............... | F01D 13/003 60/226.1 |
| 8,402,740 B2 * | 3/2013 | Guemmer | ............... | B64D 27/12 244/53 R |
| 8,789,354 B2 * | 7/2014 | Suciu | ............... | F02K 3/025 60/224 |
| 2006/0185346 A1 | 8/2006 | Rolt | | |
| 2009/0056309 A1 | 3/2009 | Roberge | | |
| 2009/0229243 A1 * | 9/2009 | Guemmer | ............... | B64D 27/12 60/226.1 |
| 2012/0272656 A1 * | 11/2012 | Norris | ............... | F02C 3/145 60/772 |
| 2013/0205747 A1 * | 8/2013 | Suciu | ............... | F02K 3/06 60/39.15 |
| 2013/0255224 A1 * | 10/2013 | Kupratis | ............... | F02C 6/02 60/226.1 |
| 2015/0013307 A1 * | 1/2015 | Burghardt | ............... | F02C 3/10 60/226.1 |
| 2015/0211416 A1 * | 7/2015 | Chandler | ............... | F02C 6/02 60/39.15 |
| 2016/0115866 A1 * | 4/2016 | Suciu | ............... | F02K 3/04 60/39.12 |

FOREIGN PATENT DOCUMENTS

| | | | |
|---|---|---|---|
| EP | 2518293 A2 | 10/2012 | |
| GB | 1554962 A * | 10/1979 | ............... F02K 3/12 |
| WO | WO 02081883 A2 * | 10/2002 | ............... F02C 3/045 |
| WO | 2013119527 A1 | 8/2013 | |
| WO | 2015/006009 A1 | 1/2015 | |

* cited by examiner

OFFSET CORE ENGINE ARCHITECTURE

CROSS-REFERENCE TO RELATED APPLICATIONS

This application claims priority to U.S. Provisional Application No. 61/947,036 filed on Mar. 3, 2014.

BACKGROUND

A gas turbine engine powering an aircraft typically includes a fan section driven by a core engine or gas generating core. The gas generating core includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

The driven shaft is required to include a structure sufficient to transmit rotation to the fan section. The power requirements of the shaft dictate the size of the shaft. The size of the shaft in turn results in a minimum diameter of core gas generating structures such as the compressor and turbine sections.

Historically, the fan section and gas generator are arranged along a common axis. The engine core must be sized such that it is built around the fan shaft. Accordingly, alternate engine configurations may be required and developed to enable improvements to thrust and engine efficiency.

SUMMARY

In one featured embodiment, a gas turbine engine has a propulsion unit including a fan, and a free turbine connected to drive the fan about a first axis, and a gas generating core. The gas generating core includes a compressor, a combustion section, and a gas generating core turbine, wherein the compressor and the gas generating core turbine are configured to rotate about a second axis. An inlet duct is configured to deliver air from the fan to the gas generating core. The inlet duct has a crescent shaped cross-section near the fan.

In another embodiment according to any of the previous embodiments, the first axis and the second axis are non-parallel to each other.

In another embodiment according to any of the previous embodiments, the free turbine is driven by the gas generating core.

In another embodiment according to any of the previous embodiments, the inlet duct is positioned near a center of the fan.

In another embodiment according to any of the previous embodiments, the inlet duct extends radially outwardly for less than 30% of a radial length of a vane of the fan.

In another embodiment according to any of the previous embodiments, the crescent shaped cross-section defines a 180° arc.

In another embodiment according to any of the previous embodiments, the inlet duct extends circumferentially about a center of the fan.

In another embodiment according to any of the previous embodiments, the gas turbine engine further comprises a second gas generating core including a second compressor, a second combustion section, and a second gas generating core turbine. The second compressor and the second gas generating core turbine are configured to rotate about a third axis.

In another embodiment according to any of the previous embodiments, the second gas generating core includes a second inlet duct configured to deliver air from the fan to the second gas generating core. The second inlet duct has a crescent shaped cross-section near the fan.

In another embodiment according to any of the previous embodiments, the third axis is non-parallel to the first axis or the second axis.

In another featured embodiment, a gas turbine engine has a propulsion unit including a fan, and a free turbine connected to drive the fan about a first axis, and a gas generating core. The gas generating core includes a compressor, a combustion section, and a gas generating core turbine. The gas generating core turbine is connected to drive the compressor, and the compressor and the gas generating core turbine are configured to rotate about a second axis. The first axis and the second axis are non-parallel to each other. The fan is configured to deliver a portion of the air it moves into an inlet duct positioned near a center of the fan, and the inlet duct being configured to feed air into the gas generating core.

In another embodiment according to any of the previous embodiments, the inlet duct has a crescent shaped cross-section near the fan.

In another embodiment according to any of the previous embodiments, the crescent shaped cross-section defines a 180° arc.

In another embodiment according to any of the previous embodiments, the inlet duct extends radially outwardly for less than 30% of a radial length of a vane of the fan section.

In another embodiment according to any of the previous embodiments, the gas turbine engine further comprises a second gas generating core including a second compressor, a second combustion section, and a second gas generating core turbine. The second gas generating core turbine is connected to drive the second compressor, and the second compressor and the second gas generating core turbine are configured to rotate about a third axis.

In another embodiment according to any of the previous embodiments, a second inlet duct is configured to feed air from near a center of the fan into the second gas generating core.

In another embodiment according to any of the previous embodiments, the second inlet duct has a crescent shaped cross-section near the fan.

In another featured embodiment, a method of arranging a gas turbine engine comprises the steps of providing a propulsion unit including a fan and a free turbine connected to drive the fan about a first axis, providing a gas generating core including at least a compressor, a combustor section, and a turbine, wherein the compressor and the gas generating core turbine rotate about a second axis, and positioning an inlet duct having a crescent shaped cross section near a hub of the fan. The inlet duct is delivering air form the fan to the gas generating core.

In another embodiment according to any of the previous embodiments, the method further comprises providing a second gas generating core. The second gas generating core includes a second compressor, a second combustion section, and a second turbine, wherein the second compressor and the second gas generating core turbine rotate about a third axis.

In another embodiment according to any of the previous embodiments, the first axis is angled relative to the second axis.

The various features and advantages of this invention will become apparent to those skilled in the art from the following detailed description of an embodiment. The drawings that accompany the detailed description can be briefly described as follows.

DETAILED DESCRIPTION

Figure 1:
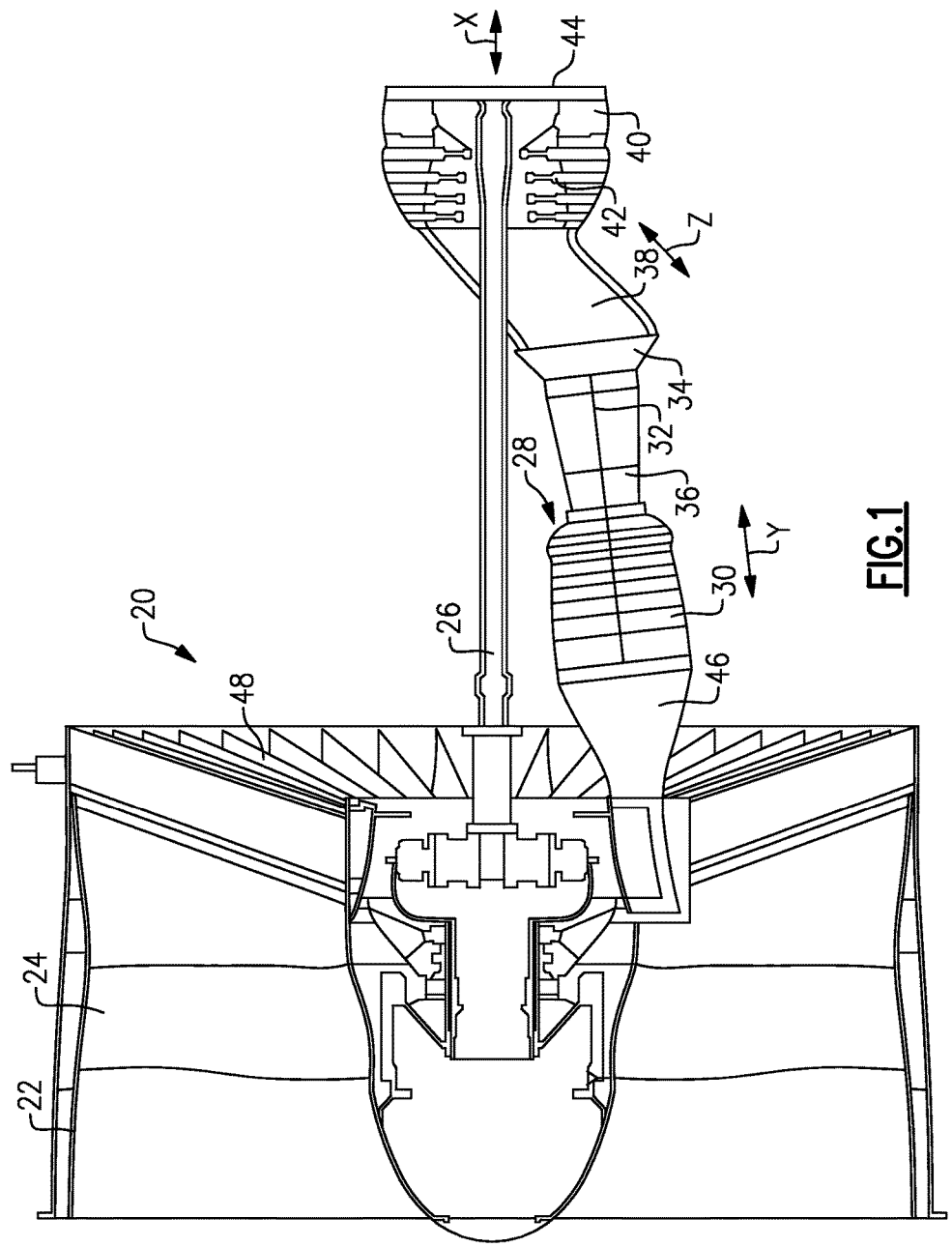
FIG. 1 shows a schematic view of a gas turbine engine.

FIG. 1 shows a gas turbine engine 20 having a fan case 22 receiving a fan 24 driven by a fan shaft 26. A core engine, or gas generating core 28 is positioned to receive air from the fan 24. The fan delivers air into the fan case 22 as bypass air, but a portion of the air passes into the gas generating core 28. The gas generating core 28 includes a compressor section 30 driven by a shaft 32 which is, in turn, driven by a turbine section 34. A combustor section 36 is positioned intermediate the compressor 30 and turbine section 34. An exhaust duct 38 extends downstream of the location of the turbine 34 into a free turbine 42 and further downstream into an exhaust housing 40. Gas generating core 28 can be a single spool gas generator or a two spool gas generator.

The products of combustion, downstream of the turbine 34, pass across a free turbine 42 which is driven to rotate to, in turn, rotate the fan shaft 26 and, thus, the fan 24. A downstream end 44 of the engine is defined at the end of the exhaust housing 40. The gas generating core 28 is offset, or angularly skewed, relative to the fan shaft 26. Exhaust powers the downstream free turbine 42 that, in turn, drives an upstream fan shaft 26.

As can be appreciated from FIG. 1, the fan shaft 26 and, hence, the free turbine 42 and fan 24 rotate along an axis X. The gas generating core 28 extends along a direction Y which is non-parallel to the axis X. In fact, the direction Y extends inwardly toward the axis X at a first angle. As can be appreciated, the exhaust duct 38 extends along a direction Z which is at a second, greater angle, inwardly toward the axis X compared to the first angle.

The example offset core engine architecture enables the use of a much smaller gas generating core. The gas generating core 28 can be much smaller because it is not required to be built around the fan shaft 26 that drives the fan. Efficiency is improved by reducing the size of the high spool within the gas generating core 28. The traditional constraints on the size of the high spool due to the size of the fan shaft 26, which passes through its center, are removed. Accordingly, the fan shaft 26 that drives the fan 24 may be constructed of a larger diameter free of any restriction caused by the gas generating core 28. The gas generating core 28 may be much smaller and operate at an elevated high overall pressure ratio as compared to conventional gas turbine engine architectures due to the elimination of constraints caused by the fan shaft 26.

Moreover, the gas generating core 28 can be fabricated to operate at optimal speeds and ratios without constraint of the fan speed. The free turbine 42 is instead fabricated and capable of rotating at an optimal speed for driving the fan. The speed of the free turbine 42 can be configured free from constraints of the turbine section 34 that drives the compressor section 30.

Figure 2:
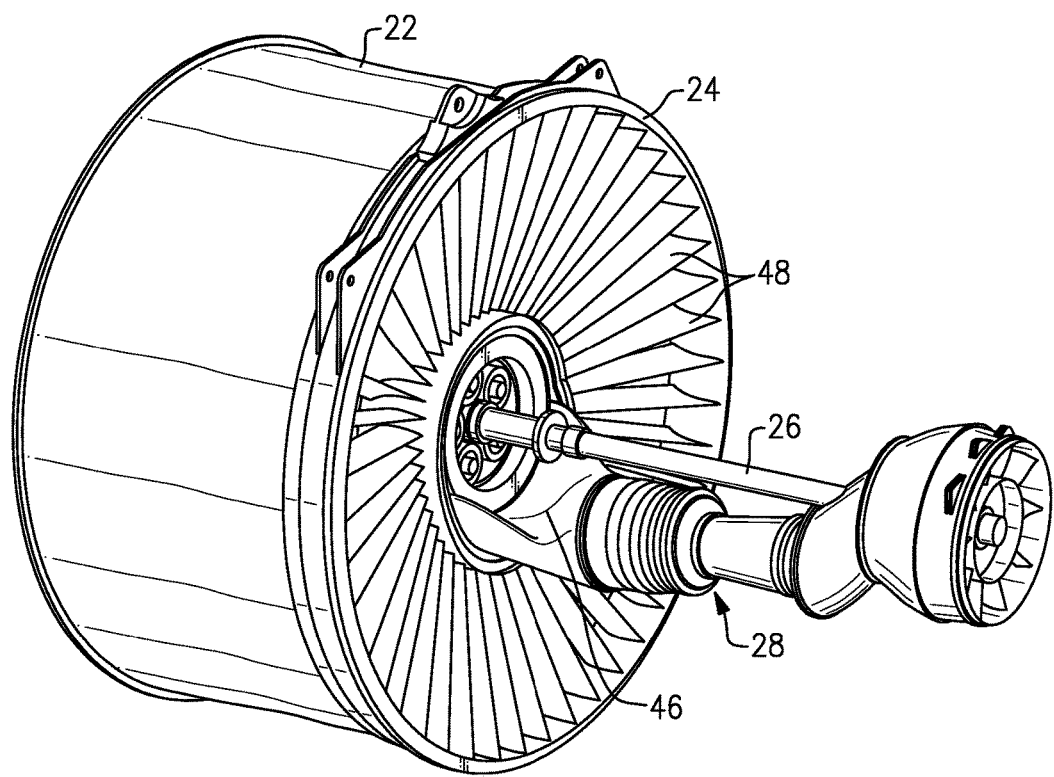
FIG. 2 shows a perspective view of the gas turbine engine of FIG. 1.

As can be appreciated from FIG. 2, the inlet for the gas generating core is disposed just aft of the fan 24 and offset from a centerline of rotation of the fan shaft 26. An inlet duct 46 is configured to communicate air from the fan 24 to the gas generating core 28. In an embodiment, a plurality of fan exit guide vanes 48 are positioned at the outlet of fan case 22. The inlet duct 46 is shaped such that it forms a crescent cross-section adjacent the fan exit guide vanes 48. The inlet duct 46 is positioned near the center of the plurality of exit guide vanes 48, and is positioned such that it curves about fan shaft 26. In an embodiment, the inlet duct 46 does not extend beyond 30% of a length of any of the plurality of exit guide vanes 48. The inlet duct can be seen to curve about the fan shaft, but for a limited circumferential extent. In one example, the crescent shaped cross-section of inlet duct 46 forms a 180° arc.

Fan 24 can pull dirt from a runway while the aircraft is on the ground. Dirt is centrifuged outward from the center of the fan, so by positioning the inlet duct 46 near the center of the fan 24, the amount of dirt entering the gas generating core 28 is reduced.

Figure 3:
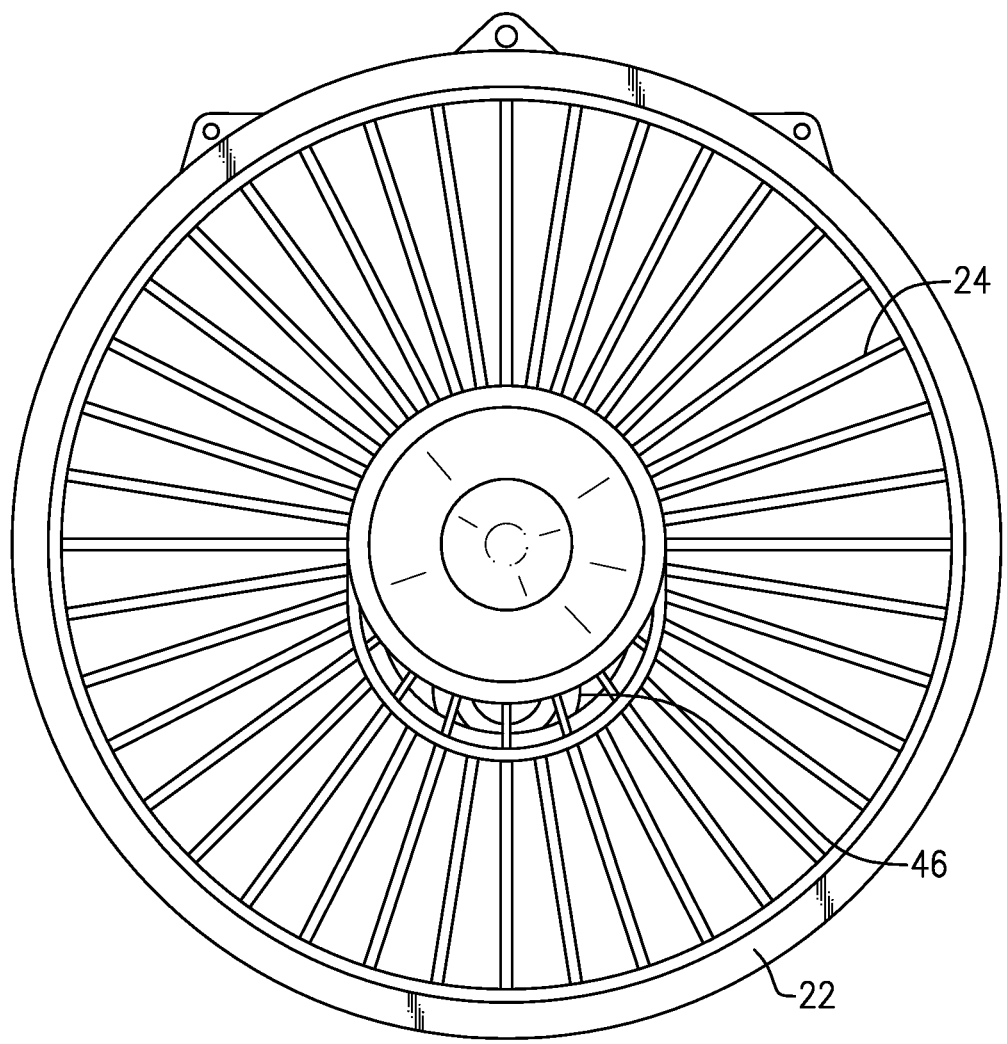
FIG. 3 shows a partial view of a portion of the gas turbine engine of FIG. 1.

The position of the inlet duct 46 is best shown in FIG. 3. The remaining flow path outside of inlet duct 46 provides propulsion. A bypass ratio of the volume of air not passing into inlet duct 46 compared to the volume that does pass into inlet duct 46 is less than or equal to 30.0.

Figure 4:
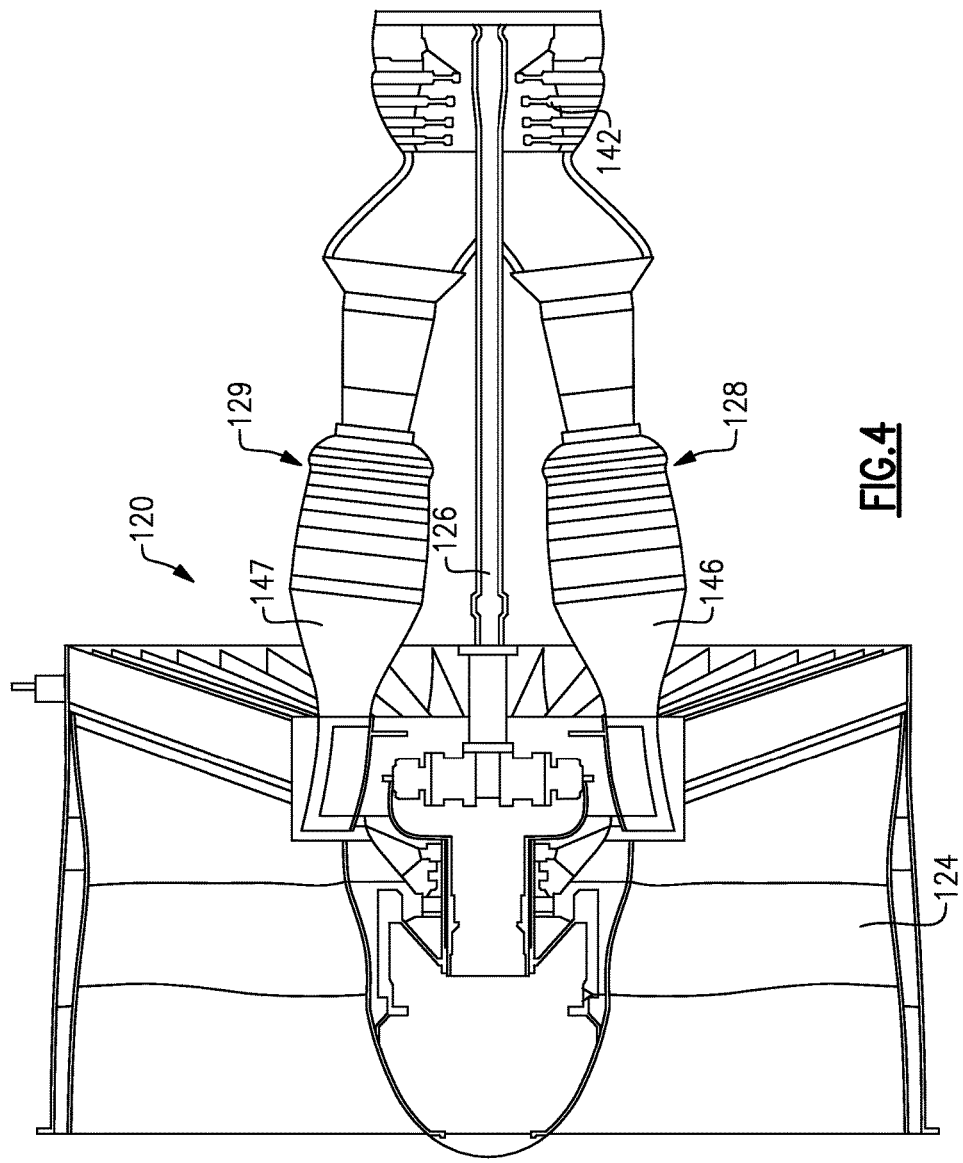
FIG. 4 shows a schematic view of an alternate embodiment.

FIG. 4 shows another embodiment with a second gas generating core. In this disclosure, like reference numerals designate like elements where appropriate and reference numerals with the addition of one-hundred or multiples thereof designate modified elements that are understood to incorporate the same features and benefits of the corresponding original elements. In this example, two gas generating cores, or core engines 128, 129 are provided that drive a single free turbine 142. The free turbine 142 drives the fan 124 through a speed reducing geared architecture. Each of the two gas generating cores 128, 129 is offset relative to the fan shaft 126 that drives the fan 124. The gas generating cores 128, 129 are mutually offset, or angularly skewed. The additional gas generating core 129 enables improved efficiencies and a desired operational redundancy.

Inlet ducts 146, 147 are provided on opposite sides of the fan shaft 126 to deliver air from fan 124 to the respective gas generating cores 128, 129. In an embodiment, both inlet ducts 146, 147 are shaped such that they form a crescent cross-section. In an embodiment, inlet ducts 146, 147 are positioned near the center of fan 124.

With two gas generating cores 128, 129, the overall length of the gas turbine engine 120 can be significantly reduced because the gas generating cores 128, 129 can be scaled down, since each only needs to supply half of the required flow. Gas generating cores 128, 129 are contained within an upper and lower bifurcating duct, so intake for each core will naturally be positioned in front of the corresponding bifurcating duct. This means that the air that would normally encounter a major blockage will instead be sucked in to feed the respective core.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a propulsion unit including a fan, and a free turbine connected through a fan shaft to drive said fan about a first axis;
a gas generating core, said gas generating core including at least a compressor, a combustion section, and a gas generating core turbine, wherein said compressor and said gas generating core turbine are configured to rotate about a second axis; and
an inlet duct configured to deliver air from said fan to said gas generating core, said inlet duct having a crescent shaped cross-section near said fan, which is curved about said fan shaft for a limited circumferential extent; and
wherein said first axis and second axis are non-parallel to each other.

2. The gas turbine engine as recited in claim 1, wherein said free turbine is driven by said gas generating core.

3. The gas turbine engine as recited in claim 1, wherein said inlet duct is positioned near a center of said fan.

4. The gas turbine engine as recited in claim 3, wherein said inlet duct extends radially outwardly for less than 30% of a radial length of a vane of said fan.

5. The gas turbine engine as recited in claim 1, wherein said crescent shaped cross-section defines a 180° arc.

6. The gas turbine engine as recited in claim 1, further comprising a second gas generating core including at least a second compressor, a second combustion section, and a second gas generating core turbine, wherein said second compressor and said second gas generating core turbine are configured to rotate about a third axis.

7. The gas turbine engine as recited in claim 6, wherein said second gas generating core includes a second inlet duct configured to deliver air from said fan to said second gas generating core, said second inlet duct having a crescent shaped cross-section near said fan.

8. The gas turbine engine as recited in claim 6, wherein said third axis is non-parallel to said first axis or said second axis.

9. A gas turbine engine comprising:
a propulsion unit including a fan, and a free turbine connected through a fan shaft to drive said fan about a first axis;
a gas generating core including a compressor, a combustion section, and a gas generating core turbine, said gas generating core turbine connected to drive said compressor, and said compressor and said gas generating core turbine are configured to rotate about a second axis;
said first and second axes being non-parallel to each other;
said fan is configured to deliver a portion of the air it moves into an inlet duct positioned near a center of said fan, said inlet duct being configured to feed air into said gas generating core; and
wherein said inlet duct extends radially outwardly for less than 30% of a radial length of a vane of the fan section, said inlet duct being curved about said fan shaft over a limited circumferential extent.

10. The gas turbine engine as recited in claim 9, said inlet duct having a crescent shaped cross-section near said fan.

11. The gas turbine engine as recited in claim 10, wherein said crescent shaped cross-section defines a 180° arc.

12. The gas turbine engine as recited in claim 9, further comprising a second gas generating core, said second gas generating core including a second compressor, a second combustion section and a second gas generating core turbine, said second gas generating core turbine connected to drive said second compressor, and said second compressor and said second gas generating core turbine are configured to rotate about a third axis.

13. The gas turbine engine as recited in claim 12, further comprising a second inlet duct configured to feed air from near a center of said fan into said second gas generating core.

14. The gas turbine engine as recited in claim 13, said second inlet duct having a crescent shaped cross-section near said fan.

* * * * *